March 25, 1930.  J. B. BROWNING  1,751,904
ELECTRICALLY WOUND SPRING MOTOR
Filed July 3, 1919  4 Sheets-Sheet 1

Fig.1

INVENTOR
John Bailey Browning
BY
A. J. Gardner.
HIS ATTORNEY

Patented Mar. 25, 1930

1,751,904

UNITED STATES PATENT OFFICE

JOHN BAILEY BROWNING, OF CAMDEN, NEW JERSEY

ELECTRICALLY-WOUND SPRING MOTOR

Application filed July 3, 1919. Serial No. 308,408.

Some of the objects of this invention are to provide an improved spring motor of simple and durable construction; to provide in a spring motor automatic means for indicating the degree of tension upon the springs; to provide an improved friction clutch arranged to prevent the springs from being wound too tight; to provide an improved automatic electric winding device, to co-operate with the winding-shaft of the motor without removing the winding-key from the machine; to provide an interchangeable spring unit, an improved power unit, an improved spring-cage, and improved means for securing the ends of the springs detachably in operative positions; to provide an improved main spring wire retainer, permitting the spring to be packed and stored normally expanded instead of remaining tightly coiled as in the present method; to provide an improved governor and an improved speed indicating device; to provide an improved spring-sleeve, provided with oil retaining recesses; to provide means adjustable to permit of the operation of a spring motor after one of its springs has been broken, and without removing the broken spring; and to provide other improvements as will appear hereinafter.

In the accompanying drawings, Fig. 14 is a perspective view of a spring cage.

Referring to the drawings, one form of the motor constructed in accordance with this invention is shown secured to and depending from a flat horizontal board 15, which may be the usual motor board of a talking machine cabinet. This motor comprises a main frame 16, which preferably consists of a single casting of iron or other metal having a flat horizontal, approximately rectangular plate or base portion 17, and a rigid, flat vertical portion or support 18, integral with and projecting laterally in a forward direction from and depending below the horizontal portion, the upper surface of the vertical portion being horizontal and in a plane with the upper surface of the horizontal portion. The frame 16 is secured to the motor board by screws 19, and is spaced therefrom by washers 20. The horizontal portion 17 is provided with two lugs 21 integral therewith and depending therefrom for supporting a governor, and with a U-shaped recess 21' to permit of the operation of the governor. The vertical support 18 is preferably rectangular and oblong in transverse section and is provided at its lower end with a lug 22 integral therewith or rigidly secured thereto which supports the lower end of a vertical turntable spindle 25.

The upper portion of the turntable spindle 25, extends snugly but rotatably through a cylindrical opening provided therefor through the horizontal portion 17 of the frame 16, and loosely through an opening provide therefor in the motor board 15. The lower portion of the spindle 25 is provided with a worm 26. An adjustable collar 27 surrounds the spindle 25 and is fixedly but removably secured to the spindle by a set screw 28 to prevent longitudinal movement of the spindle upwardly through the frame 16.

A horizontal cylindrical main driving shaft 30 fits snugly but rotatively through a cylindrical aperture provided therefor through the vertical support 18, the shaft 30 being thus centrally supported with its ends free. Each end of this shaft 30 is provided with a bayonet slot 31, and the shaft is held against longitudinal movement by two collars 32 which surround the shaft upon opposite sides of the support 18 respectively, and which are fixedly but adjustably held in position on the shaft by set screws 33.

Upon the winding side of the support 18 and mounted upon and normally rotatable with respect to the main shaft 30 is a double spring sleeve 34, which is provided in its two ends respectively with two longitudinally extending slots 35 and 36. The sleeve is also provided with a set screw 37 threaded through one side thereof for fixedly securing the sleeve to the main shaft 30 when desired for certain purposes to be described hereinafter.

Mounted upon and rotatable with respect to the sleeve 34 is a hollow drum, 38, provided with a cover plate 39, and coaxial with and rigidly secured to the drum 38 is a gear wheel 40. Connected in series and coiled inside of the drum 38, are two springs 41 and 42, the outer one of which is considerably thicker and less yielding than the inner one. The inner spring 42 is coiled around one end of the sleeve 34 any desired number of turns, and the inner end of this spring is permanently bent in the form of a hook 43 which engages in the slot 35 and holds the sleeve against rotation in one direction with respect to the hook but permits of its rotation in an opposite direction with respect to the hook to free the hook from operative engagement with the sleeve. Thus the bent inner end 43 of the spring 42 and one edge of one wall of the slot 35 serve as cooperating disengageable clutching means for the spring and sleeve. The outer end of this spring is provided with a recess or oblong hook-eye of well known form secured to 41 so that 42 is disengageably connected to the inner end of the thick outer spring 41 as shown in Figure 14, and the outer portion of the thick spring 41 binds slidably against the inner cylindrical wall of the drum, thus forming with the drum a friction clutch which is so proportioned that the thick spring 41 will not slip around with respect to the drum 38 until the spring motor has been wound up to a predetermined degree of tension whereupon any further winding of the motor causes the friction spring 41 to slip with respect to the drum 38 thus avoiding any overwinding and consequent damage to the spring motor.

Adjacent to and outside of the double sleeve 34, and surrounding the shaft 30 is a single sleeve 45 provided with a slot 36, and with a set screw 37 arranged to engage slidably in a corresponding bayonet slot 31 to hold the sleeve 45 against rotation in one direction and also against movement longitudinally with respect to the shaft 30.

A rotatable double spring cage 50 is mounted upon and is rotatable with respect to both of the sleeves 34 and 45. The cage 50 may be of any suitable construction, but is preferably formed by bending a strip of metal into a rectangular frame which is provided at each end with a straight slot 51 having a rounded end and proportioned to receive and to fit snugly around one side of the cylindrical surface of a corresponding sleeve. The cage 50 is held together by a metal band 52, and each end of the cage is provided with two studs 53 rigid therewith and around which fit snugly two looped ends 54, of a U shaped spring steel yoke 55 which surrounds one end of a corresponding sleeve and holds the same rotatably in the corresponding slot 51. The yokes 55 are arranged to be readily removed from the studs 53 when desired to permit the cage 50 to be removed laterally from the corresponding sleeves.

Within the cage 50, and spirally coiled around the two sleeves 34 and 45 are two springs 59, the inner ends of which are bent to form hooks 60, which engage respectively in the corresponding slots 36 of the sleeves to connect the springs operatively but detachably to the sleeves. The outer end of each spring 59 is formed into a hook 61 and is provided with a longitudinally extending slot 62. A spring retainer ring 63, provided with two free ends 64 is arranged around the outside of each spring and through the slot 62 of the corresponding hook 61. The hook 61 of each spring 59 is slipped over the outside of the corresponding cage 50, and the two free ends 64 of the corresponding wire retainer ring 63 are bent around the opposite wall of the cage 50. Thus the bent inner end 60 of each of the springs 59 and one edge of one wall of each of the slots 36 serve as cooperating disengageable clutch means. This is also true of the outer hooked ends 61 of the springs 59 and one edge of one wall of each of the cages 50.

Figures 4, 15, 16:
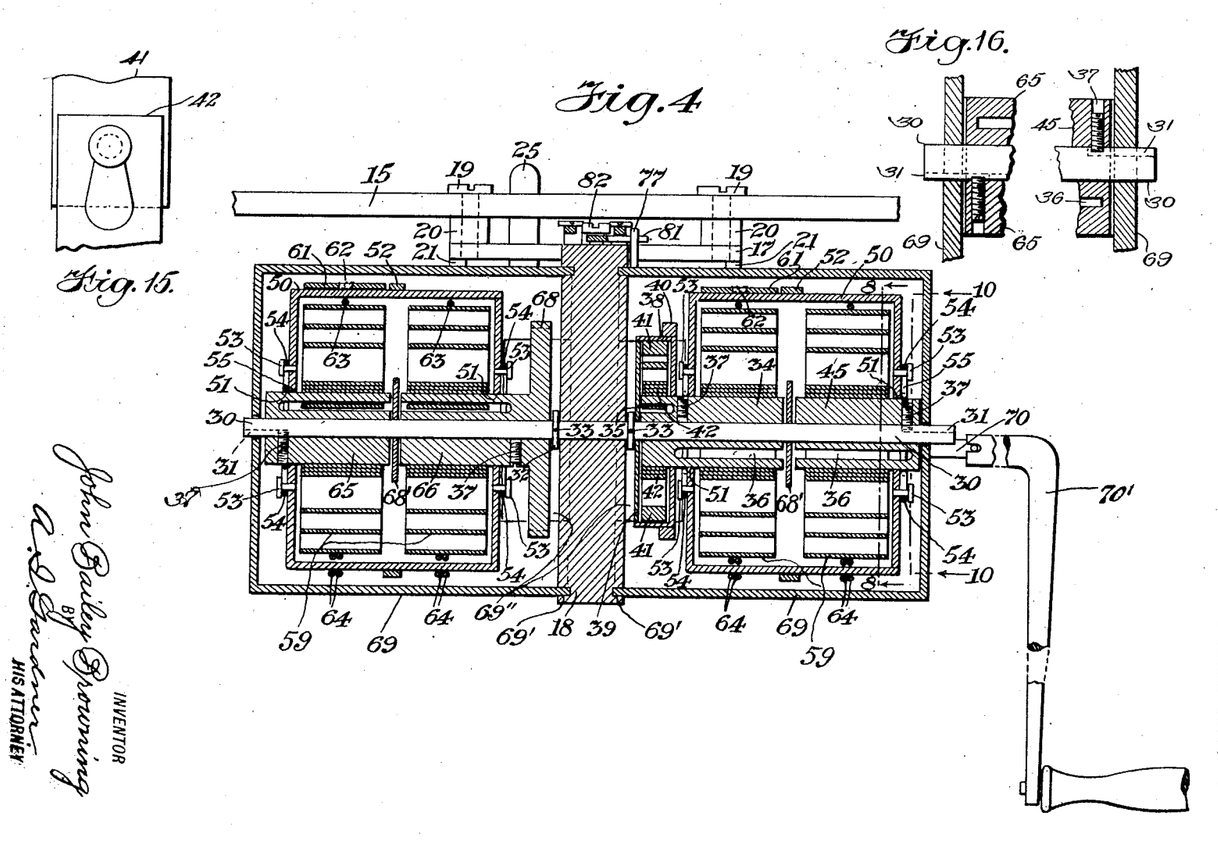
Fig. 4 is a fragmentary vertical section on a line of 4—4 of Fig. 1.
Fig. 15 a fragmentary detail view of the coupling between the springs 41 and 42.
Fig. 16 a fragmentary detail view in section of the cages 69—69 provided with bearings for the shaft 30.

Upon the left of the support 18, as viewed in Fig. 4, and surrounding the main shaft 30, are two sleeves 65 and 66, the outer one 65 of which is a duplicate of the outer sleeve 45 on the opposite end of the shaft 30, and the inner one 66 is substantially the same as the inner sleeve 34 on the opposite end of the shaft 30 except that the inner end of the sleeve 66, instead of being slotted and surrounded by a friction clutch, is surrounded by a gearwheel 68 integral therewith. These two sleeves 65 and 66 are surrounded respectively by two spiral springs 59 arranged in series in a cage 50, and each spring is retained by a ring 63 and has its outer end connected to the cage 50, and its inner end connected to the corresponding sleeve, as hereinbefore described. The outer sleeve 65 is held against rotation in one direction and against longitudinal movement in an inward direction relative to the shaft 30 by means of the corresponding set screw 37 which engages slidably in the corresponding bayonet slot 31. The inner sleeve 66 is normally rotatable relative to the shaft 30 but is provided with a set screw 37 whereby the sleeve 66 may be fixedly secured to the shaft 30 when desired. Two circular washers 68' loosely surround the shaft 30 between each pair of sleeves.

Two cylindrical grease cases 69 may be arranged over the two spring cages 50 respectively, each grease case being provided with a closed outer end having a circular central aperture through which the shaft 30 extends, and having an open inner end the marginal portion of which fits tightly but removably in an annular recess 69' provided therefor in the vertical support 18, the recess 69' being coaxial with the shaft 30. In Fig. 4 the grease cases 69 are shown as entirely supported by the vertical support 18, and with the shaft 30 extending freely through the central openings of the grease cases and out of contact with the walls thereof. With this arrangement the shaft 30 is also entirely supported by the vertical support 18. It is to be understood, however, that the grease cases 69 might be rigidly but detachably secured to the vertical support 18 in any other manner than that shown, and might be provided with central apertures fitting snugly around the shaft 30 to form bearings for the outer ends of the shaft 30 as shown in Figure 16. It is also to be understood that the grease cases 69 might be omitted without otherwise changing the construction of the motor. The grease cases 69 are provided with suitable lateral openings 69" which are arranged to permit of the cooperation of the gears 40 and 68 with other gears arranged outside of the grease cases, as will appear hereinafter, and to permit the cases to be withdrawn longitudinally of the shaft 30 without disturbing the gears or other parts.

A winding shaft 70 extends snugly but rotatively through the vertical support 18, and is provided at one end with a winding key 70'. Two washers 70" loosely surround the shaft 70 upon opposite sides of the support 18. Loosely mounted upon the shaft 70 upon one side of the support 18 are a gear 72 and a worm wheel 71, the gear 72 being rigidly secured to the worm wheel 71, and the latter being arranged to mesh with the worm 26 and rotate the turntable spindle 25.

To prevent reverse rotation of the springs 59, this invention provides an improved device including a winding gear 73 and a ratchet wheel 74, both of which are mounted upon and fixedly but detachably secured to the winding shaft 70. Preferably the winding gear 73 is provided with a hub integral therewith which is rigidly secured to the shaft 70 by a set screw 73', and the ratchet wheel 74 is fixedly secured to the winding gear 73, as by a pin 74'. A double pawl 75 is loosely mounted on a stud 76 to oscillate relative thereto and to cooperate with the ratchet wheel 74 to permit the ratchet wheel to rotate in one direction and to hold the ratchet wheel against rotation in an opposite direction. The stud 76 is rigid with a support 77 which is loosely mounted on the winding shaft 70 to oscillate with respect thereto and coaxially therewith. This support 77 is yieldingly held against rotation in one direction by a compression spring 78 which is connected at one end to the upper end of the support 77 and is adjustably supported at its other end by a regulating screw 79 which is threaded through a fixed lug 80 projecting from the support 18 to regulate the compression of the spring 78 and consequently the movement of the support 77.

To register the tension on the springs 59 a bent lever 81 is arranged to swing about a screw 82 which is fixedly threaded into the upper end of the support 18, and one end of the lever 81 engages loosely in a slot 83 in the upper end of the support 77. When the operator desires to know, while winding the springs 59, to what extent they are wound up, he releases the pressure on the winding key 70', and the reverse movement of the ratchet pulls the pawl 75 and the support 77 in a counter-clockwise direction, as viewed in Fig. 2, against the pressure of the spring 78, and this movement is communicated to the lever 81, the free end of which projects above the motor board 15 and is arranged to register the spring tension on a suitable scale 84. If it is desired to know while the motor is running how many talking machine records the motor will play before being rewound, a glance at the position of the indicator 81 upon the scale 84 is all that is necessary.

In the operation of this spring motor, when the winding shaft 70 is rotated either by hand through the action of the winding key 70', or electrically, as will appear hereinafter, the shaft 70 rotates the winding gear 73 which rotates the gear 40 of the spring cage 38 of the friction clutch, and this causes the thick spring 41 of the clutch to wind the thin spring 42 around the sleeve 34, thus rotating the sleeve 34 and winding the corresponding spring 59 which causes the corresponding cage 50 to rotate accordingly and wind the next spring 59 around the corresponding sleeve 45 which acts through corresponding set screw 37 to rotate the main driving shaft 30 which consequently acts to rotate the sleeve 65 to wind up the corresponding spring 59 which rotates the corresponding cage 50 thus winding up the last spring 59 which rotates the driving gear 68 which actuates the turn table spindle 25. Ordinarily when the motor is being wound up, the driving gear 68 and its sleeve 66 are held against rotation by the stop means 81 or 99 which will be hereafter described and the springs 59 may then be wound up until the thick spring 41 of the friction clutch slips with respect to its case 38 and prevents the springs 59 from being wound any tighter. The springs may, however, be wound up during the operation of the motor, and the friction clutch acts also in this case to prevent overwinding.

Figure 5:
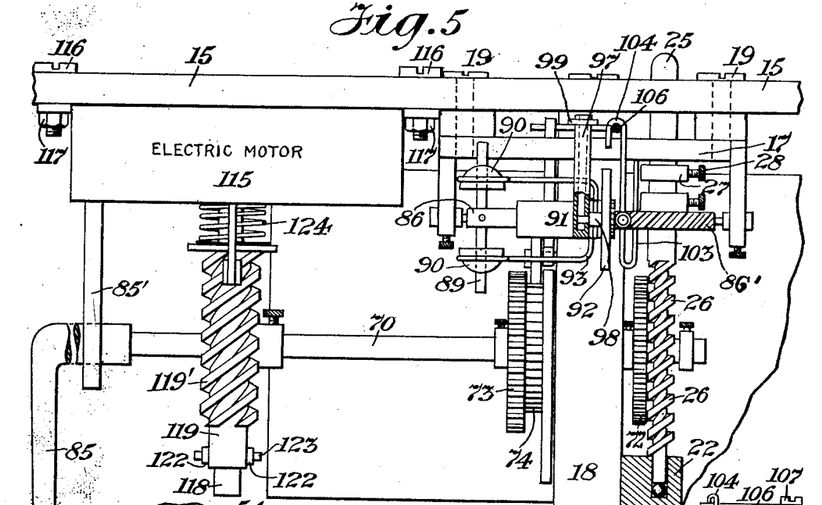
Fig. 5 is a rear elevation partly in vertical section of the improved motor.

The speed of rotation of the main driving shaft 30 may be controlled automatically by any suitable means while the motor is in operation, but this invention provides for this purpose an improved centrifugal governor comprising a spindle 86 one portion of which is smooth and cylindrical and another portion of which is surrounded by a worm 86' rigid therewith and driven by a worm wheel 87 surrounding and adjustably secured to the turn table spindle 25. The governor spindle 86 is rotatively mounted between two oppositely disposed bearings 88 which are adjustably secured in the fixed lugs 21 respectively, by means of set screws. Extending transversely through the governor spindle 86 and fixedly secured thereto is a rigid cylindrical rod 89 upon which are mounted two hemispherical balls 90, each ball being provided with a central cylindrical aperture through which the rod 89 fits loosely. A sleeve 91 provided with a friction disc 92 rigid therewith is loosely mounted on the spindle 86 and is free to move longitudinally thereof. A tempered spring steel wire 93, circular in cross section, has its central portion coiled tightly around the sleeve 91 in an annular recess provided therefor around the sleeve, and the two end portions of the wire 93 are coiled tightly around the two balls 90 respectively in annular recesses provided therefor around the balls. The balls 90 and sleeve 91 are thus secured to the spring wire 93, and the wire 93 normally holds the balls 90 yieldingly in predetermined positions, as shown in Fig. 5. When the motor is in operation, the balls 90 slide outwardly on the rod 89 against the action of the wire 93, thus flexing the wire 93 and causing the sleeve 91 to slide along the spindle towards the rod 89, and when the motor is stopped, or its speed is decreased, the wire 93 returns the balls to their normal positions or to positions corresponding to the speed of the motor.

To control the speed of the governor, a vertical tube 97 closed at its lower end, is arranged adjacent the friction disc 92, and extending transversely through the tube is a friction pad 98 of felt or other suitable material which is arranged to engage against the friction disc 92. The upper end of the tube 97 is open and extends slightly through and is rigidly secured to one end of a regulating lever 99 which is pivotally secured to the fixed support 17 by a screw 100 which is so adjusted that the lever 99 will not be moved by the action of the friction disc 92 but may be conveniently operated manually. By moving the regulating lever 99, the friction pad 98 may be adjusted toward or away from the friction disc 92 to vary the speed of the governor accordingly. By a suitable adjustment of the regulating lever 99 the rotation of the governor may be stopped and the spring motor consequently prevented from rotation. The hollow tube 97 is normally kept filled with light lubricating oil which will ooze gradually through the friction pad 98 and keep the pad and the friction disc 92 constantly lubricated, thus permitting a smooth and regular operation of the governor, and preventing the friction pad from becoming dry. A dry friction pad retards the operation of the friction disc in an irregular manner causing the governor to misgovern, to flutter, and to make loud squeaky, rattling noises, thus producing what is known as a fluttering-governor.

In this improved governor the governor balls 90 are kept in true alinement by the rod 89 thus preventing any misgoverning due to the balls getting out of alinement. The collar usually found in other governors, is omitted in this governor, and this reduces the size and cost of the governor. In the ordinary three or four spring governors now in use, there are from ten to fifteen screws and washers, involving in the construction of the governor many operations, all of which are eliminated in the construction of this improved governor, which does not include any screws or washers.

For indicating the speed of the governor a small friction pad 102 is fixedly secured to a small spring tempered spring steel wire 103, one end of which is rigidly secured to the motor frame 17, and the other end of which is provided with a loop 104, which is arranged to oscillate a speed indicating pointer 106 pivoted to the frame 17 by a pivot shoulder screw 107. The outer end of the sleeve 91 projects slightly through the friction disc 92 and the pad 102 is arranged to be pressed by the wire 103 very lightly against this end of the sleeve and in a path very close to the spindle 86, in this way not interfering appreciably with the rotary or longitudinal motion of the friction disc 92 but at the same time following the slightest movement of the sleeve 91 longitudinally of the shaft 86 in either direction and moving the pointer 106 accordingly. The free end of the pointer 106 is arranged to indicate on a fixed scale 108 the speed of the turn table spindle 25 in revolutions per minute, or the speed of any other element, as may be desired.

This invention also includes an improved electric winding device comprising an ordinary small electric motor 115 arranged below the motor board 15 and secured thereto by screws 116 and nuts 117. This motor has a vertical armature shaft 118 which is held against vertical movement and is rotated about a fixed vertical axis. Snugly surrounding the shaft 118 but slidable longitudinally thereof is a sleeve 119 provided with a worm 119' integral therewith and arranged to engage and to rotate a worm wheel 120 surrounding and rigidly secured to the winding shaft 70. The lower end of the sleeve 119 is provided with two oppositely disposed slots 121 in which loosely engage respectively two roller bearings 122 which rotate upon and are held against longitudinal movement with respect to a pin 123 which extends diametrically through and is rigidly secured to the shaft 118. These rollers transmit rotary motion from the shaft 118 to the sleeve 119.

Around the shaft 118 is loosely coiled a spring 124, the upper end of which is held against upward movement by a fixed horizontal wall of the electric motor 115. Loosely surrounding the shaft 118 and bearing against the lower end of the spring 124 and the upper end of the sleeve 119 is a circular washer 125 of insulating material surrounding and rigidly secured to which is a ring 125' of copper or other electrically conductive material which is arranged to remain in sliding engagement with a substantially stationary elongated conductor 126 which forms one of the terminals of the electric motor 115 and to be moved vertically into and out of sliding engagement with a substantially stationary, vertically elongated conductor or contact 127 which is carried by but insulated from a fixed bracket 128. A conducting post 129 is mounted fixedly upon but insulated from the swinging support 77 and is arranged to be rotated thereby into and out of engagement with a fixed conductor 130 which forms the second terminal of the electric motor 115. The conductor 127 and the post 129 are connected respectively through two flexible conductors 131 and 132 to the opposite terminals of any suitable source of electric current, such for instance as a direct current generator.

Figure 1:
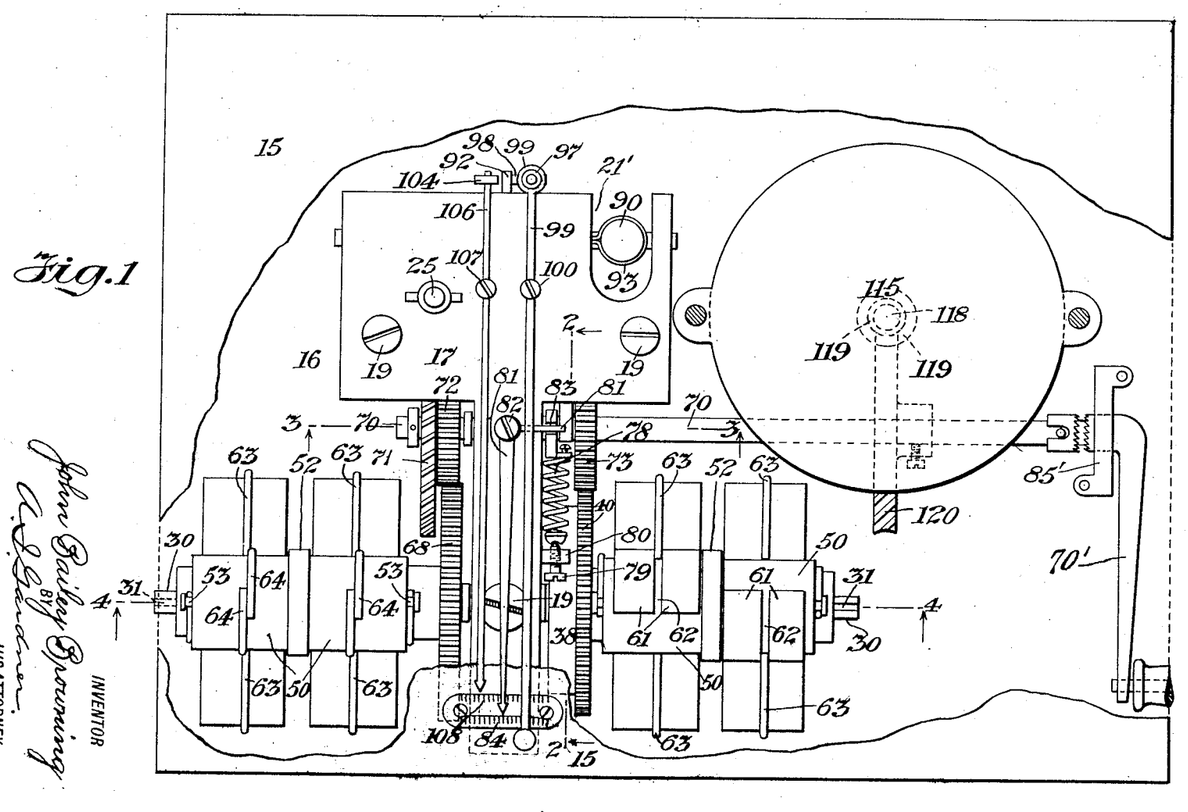
Fig. 1 is a fragmentary plan view of a mechanism constructed in accordance with this invention.
Figures 1A, 2, 3:
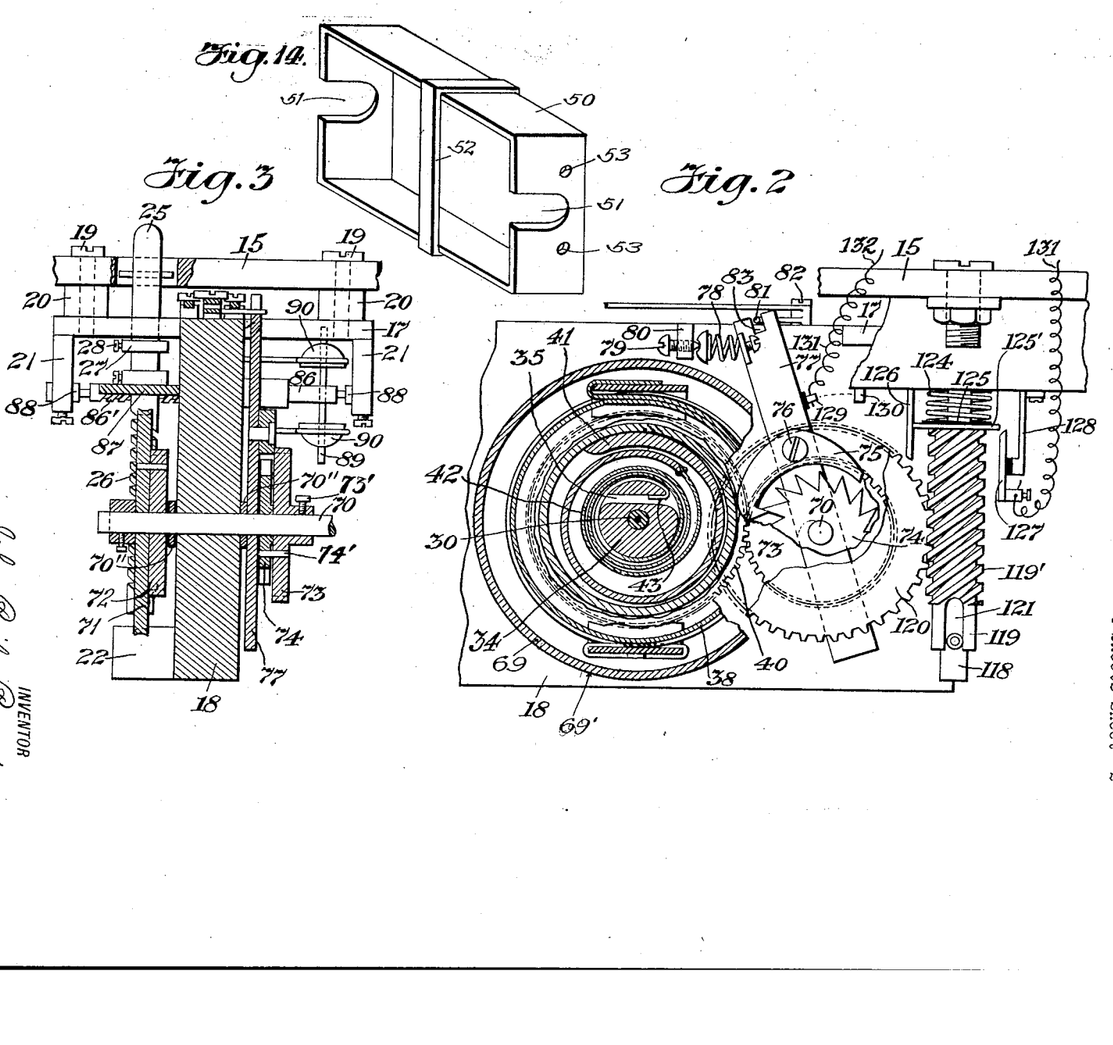
Fig. 2 a fragmentary side elevation, partly in section of the same on the line 2—2 of Figure 1.
Fig. 3 is a fragmentary vertical section on a line of 3—3 of Fig. 1.

The parts are so proportioned and arranged that when the main springs 59 of the motor have been fully wound up but not overwound by the electric motor, the parts of the winding mechanism will have assumed the positions shown in Fig. 2, the sleeve 119 being in its uppermost position and having forced the circular contact 125' out of engagement with the stationary contact 127 and consequently broken the circuit through the electric motor 115, which will cause the ratchet and pawl 74 and 75, respectively, to pull the support 77 back, breaking the contact between 129 and 130, thus breaking the circuit through the electric motor. As the pressure of the springs decreases, the worm 119' automatically moves down the shaft 118 until the conductors 125' and 127 are reconnected. The support 77 meanwhile gradually moves back toward the contact 130, the arrangement being such that when the springs are nearly run down, the support 77 is forced back by the spring 78 and brings the connection 129 in contact with the connection 130, thus automatically completing the circuit through the electric motor, causing it to repeat its winding operation. If it is desired, the connection can be made or disconnected at any time by the operator by moving the lever 81 in one direction or the other. The lever 81 thus constitutes a start and stop means mounted in the space between the motor plate and the motor frame. This is in addition to the regulating lever 99 which also serves as a start and stop means.

Figures 6, 7, 8, 9, 10, 11, 12, 13:
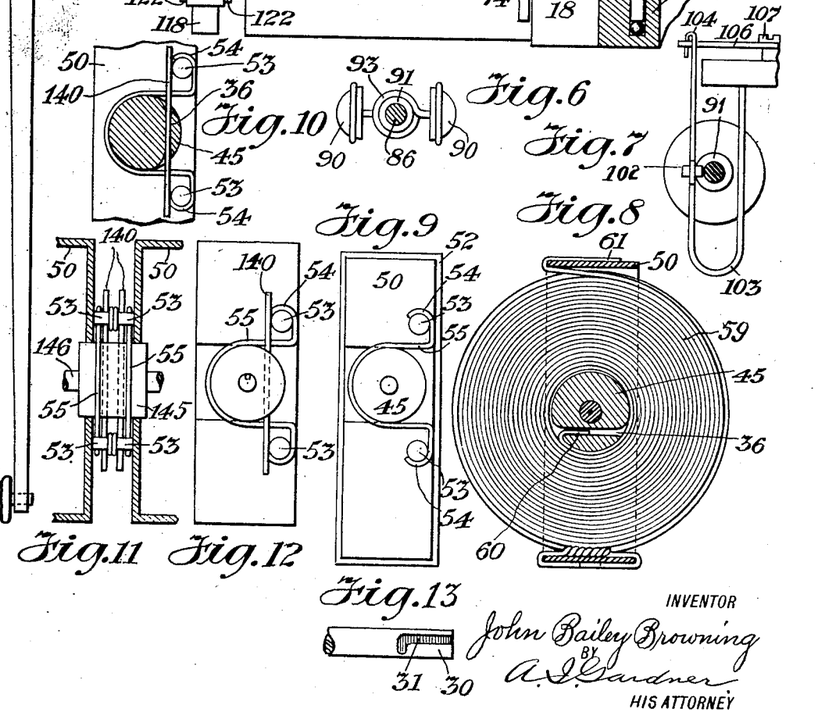
Figs. 6 and 7 are end views of details of the same partly in transverse section.
Fig. 8 a transverse section on line 8—8 of Fig. 4 looking in the direction of the arrows.
Fig. 9 an end elevation of the spring cage shown in Fig. 8.
Fig. 10 a transverse section on line 10—10 of Fig. 4 but with the addition of a locking rod.
Fig. 11 a fragmentary longitudinal section of a modified form of this invention.
Fig. 12 an end elevation of the form shown in Fig. 11.
Fig. 13 an enlarged fragmentary plan view of a portion of the improved motor.

In Fig. 10 is shown the addition of a locking pin 140 to the construction hereinbefore described for the purpose of locking the hereinbefore described sleeve 45 to the corresponding cage 50 to prevent rotation of the sleeve 45 with respect to the cage. In this arrangement the pin 140 is inserted through the portion of the slot 36 which extends beyond the outer end surface of the cage 50, the pin being arranged so that its opposite ends will engage against the inner surfaces of the two pins 53 to hold the sleeve 45 against rotation with respect to the cage 50. In a similar manner the same pin or an additional pin 140 might be inserted through the corresponding slot to lock any one of the sleeves 34, 66 or 65 against rotation with the corresponding cage 50. The use of one or more locking pins 140 in this manner is found convenient in case of one or more of the springs 59 becoming accidentally broken. By thus locking one or more of the sleeves 34, 45, 65 or 66 to the corresponding spring cage 50, the operation of the motor might be continued after such breakage without removing the broken spring or springs. For instance, if the spring surrounding the sleeve 45 should become broken the pin might be inserted through the sleeve 45 as just described to lock the sleeve to the cage 50, and the operation of the motor might then be continued without removing the broken spring 59. Also if the spring surrounding the sleeve 45 and also the spring surrounding the sleeve 65 should become broken, then pins 140 would be inserted through the sleeves 45 and 65 to lock these sleeves to their cages 50, and the operation of the motor might then be continued without removing either of the broken springs. In the same manner and for a similar purpose either of the sleeves 34 or 66, or any one or more of the sleeves, might be thus locked to the corresponding cages 50.

The set-screws 37 in the sleeves 34 and 66 serve to lock either of these sleeves to the shaft 30 when necessary to continue the operation of the motor after one or more main springs 59 have been accidentally broken. For instance, if the two springs 59 surrounding the sleeves 34 and 45 should both become broken the set-screws 37 through the sleeves 34, 45 may be tightened upon the shaft 30 to lock the sleeves to the shaft and the motor might then be operated without removing the broken springs. In the same manner if both of the springs 59 surrounding the sleeves 65 and 66 should become broken the operation of the motor might be continued by locking the sleeve 66 to the shaft 30 by tightening the corresponding set-screw 37, and the operation of the motor might then be continued without replacing the broken springs.

In Figs. 11 and 12 are shown two spring cages 50 locked to a single sleeve 145 rotatably surrounding a shaft 146, the construction of the cages 50 and the locking mechanism being the same as hereinbefore described, the pins 140 in this instance being arranged to extend through one or more slots or openings provided therefor in the sleeve 145. This arrangement might be found useful in certain modified forms of the motor.

From the foregoing it is evident that the hereinbefore described spring motor may be easily assembled and may be quickly and conveniently taken apart for repairs or replacements.

It is to be understood that the grease case 69 may be withdrawn longitudinally of the shaft 30 without loosening any screws or disturbing any other part of the motor.

In the manufacture and sale of this improved motor on a large scale, the springs 59 would be kept in stock as repair parts, each spring being secured in a retaining ring which is a duplicate of the rings 63, the springs being thus stored in an expanded condition and not in a tightly wound condition, as has heretofore been the practice. When springs are stored in a tightly wound condition for a considerable length of time the springs are apt to lose some of their resiliency. By having the springs thus stored in the improved retainer rings 63, when a spring of a motor becomes broken a duplicate with a new retainer ring 63 thereon may be substituted for the old spring and its retainer ring 63, the old retainer ring 63 being disconnected from its cage 50 by unbending the free ends 64 from engagement with the cage 50 and by sliding the ring and the contained spring longitudinally from the sleeve surrounded thereby and then removing the spring with its retaining ring laterally from the cage 50. The spring 59 with its container ring 63 are thus combined to form a separate article of manufacture and sale.

It is to be understood that this invention is not limited to the specific construction hereinbefore described and might be embodied in various forms without departing from the spirit of the invention or the scope of the appended claims.

Having thus fully described my invention, I claim:

1. A spring motor having in combination a support, a shaft extending rotatably therethrough and projecting in opposite directions therefrom, and a spring unit including a rotatable cage inclosing a coiled spring surrounding said shaft upon each side of said support, said spring units being connected in series and being freely withdrawable from said shaft without changing the position of said shaft in said support.

2. A spring motor having in combination a support, a shaft extending rotatably therethrough and projecting in opposite directions therefrom, and a spring unit including a rotatable cage inclosing a coiled spring surrounding said shaft upon each side of said support, said spring units being connected in series and being freely withdrawable from said shaft without changing the position of said shaft in said support, and said shaft being entirely supported by said support.

3. A spring motor comprising a stationary support, a shaft extending rotatably through said support and projecting freely in opposite directions therefrom, and a plurality of separable spring units connected in series and mounted upon said shaft upon each side of said support, each of said spring units including a rotatable spring cage inclosing a coiled spring and being freely removable from said shaft while said shaft is maintained in a normal position in said support.

4. A spring motor comprising a shaft, a sleeve loosely surrounding said shaft, driving a spring secured to and wound around said sleeve and a friction clutch surrounding said sleeve for winding said spring.

5. A spring motor comprising a shaft, a sleeve loosely surrounding said shaft, driving a spring secured to and wound around said sleeve and a friction clutch surrounding said sleeve for winding said spring, said friction clutch including a hollow member surrounding said sleeve and a member yieldingly pressed against the interior surface of said hollow member and slidable with respect thereto.

6. A spring motor comprising a plurality of driving springs, an element arranged to be rotated by all of said springs acting in series, and locking means whereby in case one of said springs should be accidentally broken the remaining springs may be connected in series to rotate said element.

7. A spring motor comprising a shaft, a plurality of driving springs surrounding said shaft, an element arranged to be rotated by all of said springs acting in series, and locking means whereby in case any one or more of said springs should be accidentally broken, the remaining spring or springs may be connected to rotate said element.

8. A spring motor comprising a fixed support, a shaft wholly supported by and projecting freely from said support and a spring unit surrounding said shaft and freely withdrawable therefrom without moving said shaft longitudinally from its normal position of longitudinal adjustment with respect to said support, said spring unit including a sleeve surrounding said shaft and a spiral spring surrounding said sleeve and having one end secured thereto, the outer end of said spring being free to rotate about said shaft.

9. A spring motor comprising a fixed support, a shaft extending through and projecting in opposite directions from said support and a spring unit including a rotatable cage inclosing a coiled spring surrounding said shaft upon each side of said support, each of said units being freely removable from said shaft while said shaft is held in its normal position of longitudinal adjustment with respect to the support, said springs being operatively connected to act in series.

10. A spring motor comprising a shaft, a spring cage supported by said shaft and removable from said shaft in a direction extending transversely of the longitudinal axis of said shaft, and a spring coiled around said shaft and having one end secured to said cage.

11. A spring unit for spring motors, comprising a spring cage provided with a recess adapted to receive supporting means, a member operatively connected to said cage to hold said cage against withdrawal from said supporting means in a direction transverse to said supporting means but permitting the rotation of said cage with respect to said supporting means.

12. A spring unit for motors, comprising a spring cage provided with a recess adapted to receive supporting means, a yoke operatively connected to said cage to hold said member against withdrawal from said supporting means in a direction transverse to said supporting means but permitting the rotation of said member with respect to said supporting means, and a member for holding said yoke against rotation with respect to said supporting means.

13. A spring motor comprising a support, a shaft extending through said support, a spring unit coiled around said shaft on each side of said support, including a spiral spring, the spring of one unit being in series with the spring of another unit, a winding gear concentric with said shaft and arranged between one of said units and said support, a winding shaft substantially parallel with said first mentioned shaft and extending through said support, a pinion mounted on said winding shaft and engaging said winding gear, a driving gear concentric with said first mentioned shaft and arranged upon the opposite side of said support from said winding gear, and between said support and one of said spring units, a pinion loosely mounted upon said winding shaft and engaging and actuated by said driving gear, a spiral gear loosely mounted upon said winding shaft and a rotary turntable spindle provided with a worm engaged and driven by said spiral gear, a ratchet wheel fixed upon said winding shaft between said winding pinion and said support, a lever loosely mounted upon said winding shaft between said ratchet wheel and said support, a pawl pivotally connected to said lever and arranged to engage said ratchet wheel, yieldingly holding said lever against rotation under the action of said ratchet wheel and means controlled by said lever for indicating the tension of the springs of said spring units.

14. A spring motor in accordance with claim 13 and having an electric motor arranged to rotate said winding shaft and to be automatically rendered operative or inoperative by the action of said lever.

15. A spring motor comprising a plurality of driving spring power units, an element arranged to be rotated by all of said units acting in series, and means whereby in case one of said series becomes inoperative the remaining units may be connected in series to rotate said element.

16. A power unit for spring motors, including a spring wound in spiral form and provided with disengageable clutching means and a permanent keeper engaging the periphery of the spring and retaining it normally expanded.

17. A power unit for spring motors including a spring cage, a spring wound in spiral form, one end of said spring being freely disengageably connected to said cage, and a permanent keeper engaging the periphery of said spring and the inner walls of said cage.

18. A power unit for spring motors including an outer and an inner clutch element, a spring coiled around the inner element and within the outer element and disengageably connecting said elements, and a permanent keeper engaging the periphery of said spring and arranged within the outer element.

19. A power unit for spring motors including a spring cage, a sleeve located within said cage and a spring coiled about said sleeve, said cage and the outer end of said spring being provided with cooperating disengageable clutching means and said sleeve and the inner end of said spring being provided with cooperating disengageable clutching means, whereby the three elements are disengageably clutched together.

20. A power unit for spring motors including a spring cage, a sleeve located within said cage and a spring coiled about said sleeve and disengageable clutching means for operatively connecting said spring to both said cage and said sleeve.

21. In a power unit for spring motors, the combination of a spring cage with a spring located in said cage, a sleeve for said spring also located in said cage and means operative to disengageably connect said sleeve, cage and spring together.

22. In a spring motor, the combination with a shaft, of a plurality of spring units movably mounted on said shaft, a winding and a driving gear mounted on said shaft between said units, and a bearing for said shaft located adjacent to and between said gears, means to connect said units in series through said shaft whereby said units drive said driving gear, the point of application of power to and from said gears being adjacent said bearing between said units.

23. In a multiple spring motor, a driving gear and a winding gear, a plurality of driving units, one located on each side of said gear, a shaft extending through said units and said gears, a bearing for said shaft located between said gears, means to connect said units in series to said gears through said shaft whereby both of said units drive said driving gear, the point of application of power to and from said gears being adjacent said bearing between said units.

24. In a spring motor, the combination with a cylindrical drum and a spiral spring coiled therein adapted to be placed under tension, of an auxiliary spring coiled around said first mentioned spring, disengageably connected thereto and yieldingly pressed against the inner cylindrical surface of said drum and slidable with respect thereto.

25. In a spring motor, the combination with a cylindrical drum, a spiral spring coiled therein and adapted to be placed under tension, said spring being pressed against the inner cylindrical surface of said drum and slidable with respect thereto, and a clutch member positioned in said drum and disengageably connected to the inner coil of said spring.

26. The combination with a spring motor including a winding shaft, a ratchet fixed upon said shaft, a support loosely surrounding said shaft and arranged to oscillate with respect thereto, a pawl pivotally connected with said support and arranged to engage said ratchet, and means opposing the movement of said support in one direction.

27. In a spring motor, the combination with a spring shaft, a plurality of spring power units movably mounted on said shaft, a support provided with a bearing forming the sole support for said shaft, a winding gear and a driving gear mounted on said shaft on each side of said support adjacent said bearing, a winding shaft, a bearing for said winding shaft through said support, a winding pinion and a driving pinion mounted on said winding shaft on each side of said support adjacent the bearing of said winding shaft, a worm wheel carried by said driving pinion, a worm shaft having a bearing in said support in cooperation with said worm wheel and means cooperating with said worm shaft to control, regulate and indicate its speed of rotation.

28. A spring motor comprising a plurality of driving spring units, a plurality of springs positioned in each of said units in series, an element arranged to be rotated by all of said springs acting in series, and means whereby any two or more of said springs may be operated as a single power unit connected in series to operate said element.

29. A power unit for spring motors, including a spring cage, a spring wound in spiral form arranged in said cage and connected thereto, and a permanent keeper engaging the periphery of said spring arranged within said cage and freely disengageably connected thereto.

30. In a spring motor, the combination with a plurality of spring cages, a spiral spring coiled within each cage and around a sleeve extending between and into each of a pair of cages and disengageably clutching said springs together in series.

31. In a spring motor, the combination with a plurality of power units, a plurality of springs in one of said units, a sleeve extending between and into each of a pair of said units and disengageably connecting said units in series.

32. A power unit for spring motors comprising a spring wound in spiral form, and a permanent keeper engaging the periphery of the spring, and provided with means to disengageably support said keeper within said unit.

33. A power unit for spring motors, comprising an inner and an outer element, a spring wound in spiral form operatively positioned within said outer element and around said inner element, and a permanent keeper engaging the periphery of said spring when operatively positioned within said outer element and freely removable with said spring as a unit from each of said elements.

34. A power unit for spring motors, comprising a spring cage, a plurality of springs operatively positioned in said cage, any one of said springs being freely removable and interchangeable with one another in said cage while normally expanded.

35. A spring motor having in combination, a support, a shaft extending therethrough and projecting in opposite directions therefrom, and spring units surrounding said shaft upon each side of said support, said springs being freely withdrawable from said shaft without changing the position of said shaft in said support, and detachable means normally carried rigidly by said support and provided with apertures to form bearings for the free ends of said shaft.

36. In a device of the character described, an integral frame having a base plate portion lying in a given plane, a spring motor having a shaft mounted in the frame and extending parallel with the plane of said base portion, a driven shaft extending substantially perpendicularly to the plane of said base portion and a governor shaft also mounted upon the frame.

37. In a device of the character described, an integral frame having a base plate portion lying in a given plane, a spring motor having a shaft mounted in the frame and extending parallel with the base portion, a driven shaft extending substantially perpendicularly to the plane of said base portion, and gear means connecting the motor shaft with the driven shaft and rotatable in a plane substantially perpendicular to the plane of said base portion, and a governor shaft also mounted upon the frame.

38. In a device of the character described, an integral vertically disposed frame, a spring motor, its horizontally disposed shaft mounted in the frame, a vertically disposed driven shaft mounted in the frame, and a governor shaft also mounted in the frame.

39. In a spring motor, the combination with a shaft, a plurality of spring cages movably mounted on said shaft, a spiral spring coiled within each cage and around a sleeve surrounding said shaft, said sleeve extending between and into a pair of cages and disengageably clutching said springs together in series.

40. In a spring motor, the combination with a shaft, a pair of power units movably mounted on said shaft, a plurality of springs in one of said units, a sleeve surrounding said shaft extending between and into each of a pair of said units and disengageably connected to one of said springs in each of said units disengageably connecting said units in series.

41. The combination in a motor, of a frame having a base and projecting side portions, a horizontal spring shaft supported by the side portions, power spring means supported upon the spring shaft, a gear journalled upon the spring shaft adapted to be driven by the spring means, a vertical shaft journalled in the frame, a horizontal intermediate shaft journalled in the frame between the spring shaft and the vertical shaft, the gear on the intermediate shaft meshing with the spring driven gear, worm gears between the intermediate shaft and the vertical shaft and a governor geared to the vertical shaft.

42. The combination in a motor of a frame, a spring shaft supported by the frame, power spring means supported upon the shaft, a gear connected to the power spring means and adapted to be driven thereby, a shaft adapted to support an article to be rotated, an intermediate shaft between the spring shaft and the said last named shaft and adapted to be driven by said gear, and a governor, the governor, the intermediate shaft, and the spring shaft being disposed in parallel relation.

43. The combination in a motor frame, a horizontal spring shaft supported by the frame, power spring means supported upon the shaft, a gear connected to the power spring means and adapted to be driven thereby, a vertical shaft, a horizontal intermediate shaft between the spring shaft and the last named shaft and adapted to be driven by said gear, a horizontal governor shaft and a governor carried thereby, the governor shaft, the intermediate shaft, and the spring shaft being disposed in parallel relation.

44. In combination, a motor plate, a motor frame secured thereto and providing a space therebetween, a motor carried by the motor frame, a rotatable element driven by the motor, and a start and stop means mounted in the space between the motor plate and the motor frame, and adapted to cooperate with the motor to start and stop it.

45. In combination, a motor plate, a motor frame secured thereto and providing a space therebetween, a motor carried by the motor frame, a rotatable element driven by the motor, and start and stop means pivotally mounted upon the motor frame in the space between the motor plate and the motor frame, adapted to cooperate with the motor to start and stop it.

46. In combination, a motor plate, a motor frame secured thereto and providing a space therebetween, a motor carried by the motor frame, a rotatable element driven by the motor, and speed regulating means pivotally mounted between the motor frame in the space between the motor plate and the motor frame to cooperate with the motor to regulate the speed thereof.

47. In combination, a motor plate, a motor frame secured thereto and providing a space therebetween, a motor carried by the motor frame, a rotatable element driven by the motor, and speed indicating means pivotally mounted between the motor frame in the space between the motor plate and the motor frame to cooperate with the motor to indicate the speed thereof.

Signed at Philadelphia, in the county of Philadelphia and State of Pennsylvania, this 2nd day of July, A. D. 1919.

JOHN BAILEY BROWNING.